United States Patent
Yang et al.

(10) Patent No.: US 8,462,054 B2
(45) Date of Patent: Jun. 11, 2013

(54) HOUSING AND METHOD FOR MAKING THE SAME

(75) Inventors: Zhi-Jun Yang, Shenzhen (CN); Mei-Wen Fu, Shenzhen (CN); Zhan Li, Shenzhen (CN)

(73) Assignees: Shenzhen Futaihong Precision Industry Co., Ltd., Shenzhen (CN); FIH (Hong Kong) Limited, Kowloon (HK)

( * ) Notice: Subject to any disclaimer, the term of this patent is extended or adjusted under 35 U.S.C. 154(b) by 470 days.

(21) Appl. No.: 12/774,069

(22) Filed: May 5, 2010

(65) Prior Publication Data

US 2011/0135858 A1    Jun. 9, 2011

(30) Foreign Application Priority Data

Dec. 3, 2009   (CN) .......................... 2009 1 0310850

(51) Int. Cl.
*H01Q 1/24* (2006.01)
*H01Q 1/40* (2006.01)

(52) U.S. Cl.
USPC ........................... 343/702; 343/872; 343/873

(58) Field of Classification Search
USPC ........................ 343/700 MS, 872, 873, 702
See application file for complete search history.

(56) References Cited

U.S. PATENT DOCUMENTS

| | | | | |
|---|---|---|---|---|
| 7,060,421 | B2 * | 6/2006 | Naundorf et al. | 430/324 |
| 8,068,067 | B2 * | 11/2011 | Hong et al. | 343/873 |
| 2004/0241422 | A1 * | 12/2004 | Naundorf et al. | 428/323 |
| 2009/0051616 | A1 * | 2/2009 | Hong et al. | 343/872 |
| 2010/0149047 | A1 * | 6/2010 | Tsujimura | 343/702 |

OTHER PUBLICATIONS

Tjong et al, "Effect of reactive compatibilizers on the mechanical properties of polycarbonate/poly(ABS) blends," European Polymer Journal 36 (2000), 123-129.*

* cited by examiner

*Primary Examiner* — Hoang V Nguyen
(74) *Attorney, Agent, or Firm* — Altis Law Group, Inc.

(57) ABSTRACT

A housing includes a first main body and a second main body. The first main body includes laser activator. An antenna radiator is formed on the first main body by laser, and an electroplating or a chemical plating method. The second main body is formed on the first main body and partially coats the antenna radiator. The antenna radiator is partially exposed from the first main body and the second main body to form a terminal.

14 Claims, 4 Drawing Sheets

HOUSING AND METHOD FOR MAKING THE SAME

BACKGROUND

1. Technical Field

The present disclosure relates to device housings, and particularly to a housing used in electronic devices and a method for making the housing.

2. Description of Related Art

Portable electronic devices, such as mobile phones, personal digital assistants (PDAs) and laptop computers are widely used. Many utilize antenna modules for receiving and sending wireless signals. A commonly used antenna module includes a carrier having an antenna layer attached on the carrier.

However, the antenna layer is exposed from the carrier and may be easily damaged. Thus, the performance of the antenna modules may be influenced.

Therefore, there is room for improvement within the art.

BRIEF DESCRIPTION OF THE DRAWINGS

Many aspects of a housing and method for making the housing can be better understood with reference to the following drawings. The components in the drawings are not necessarily to scale, the emphasis instead being placed upon clearly illustrating the housing and method for making the housing. Moreover, in the drawings, like reference numerals designate corresponding parts throughout the several views.

DETAILED DESCRIPTION

Figure 1:
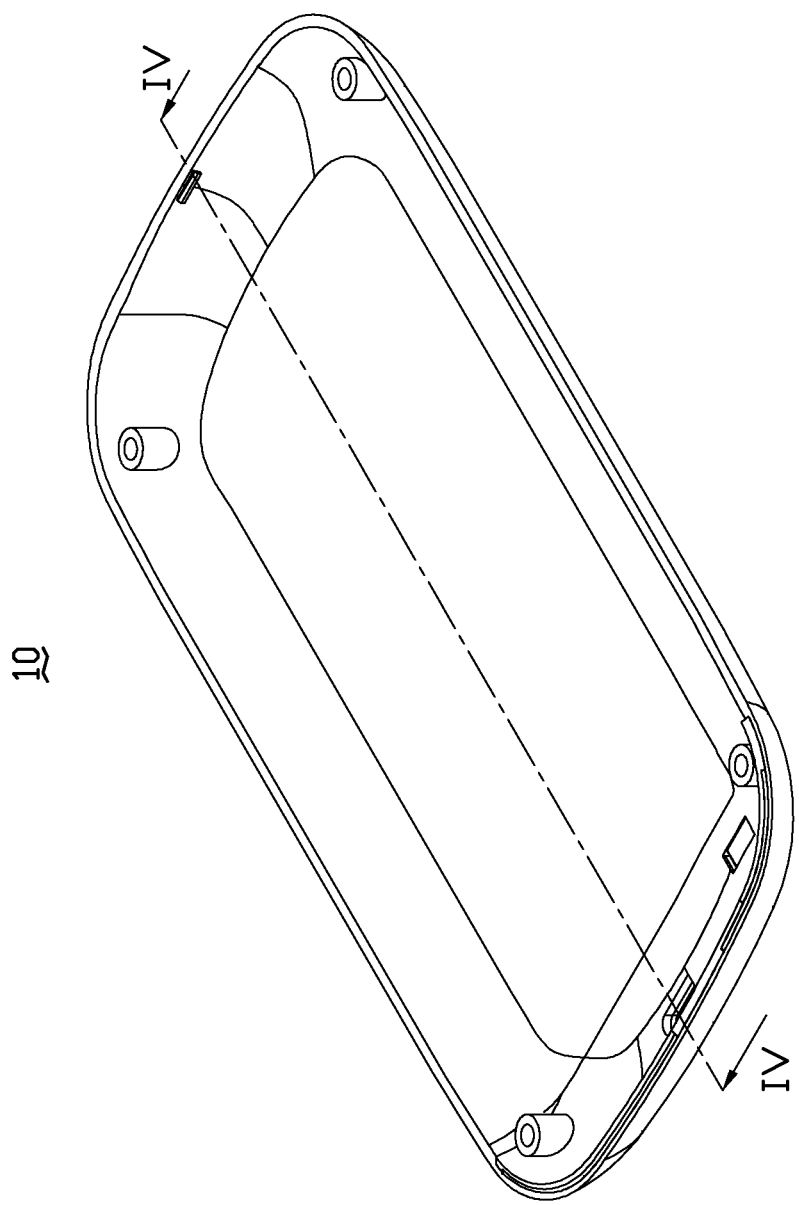
FIG. 1 is an isometric view of an exemplary housing for an electronic device.

FIG. 1 shows an exemplary housing 10 used in an electronic device, such as a mobile phone, a personal digital assistant, and so on.

Figure 2:
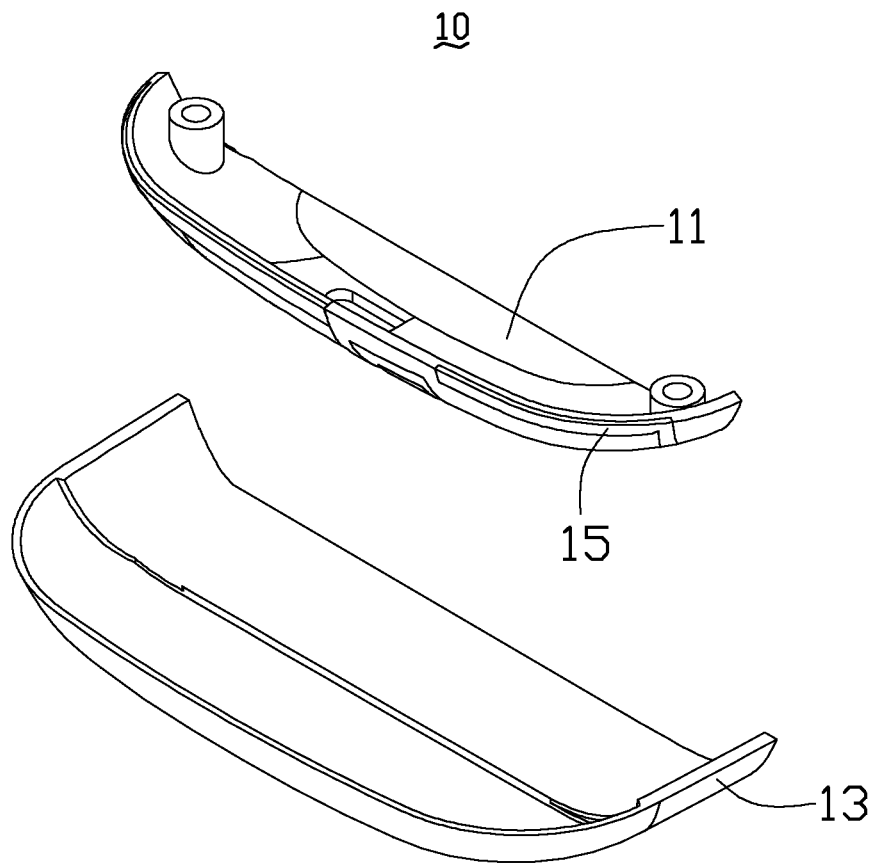
FIG. 2 is an exploded view of one end of the housing shown in FIG. 1 including an antenna radiator and a first main body.

Referring to FIG. 2, the housing 10 includes a first main body 11, a second main body 13, and an antenna radiator 15 formed between the first main body 11 and the second main body 13.

The first main body 11 can be formed by injection molding. Material of the first main body 11 can be a mixture of materials selected from a group consisting of thermoplastic, organic filling substances, and laser activator. The thermoplastic can be made of polyvinyl chloride, polyethylene terephthalate, acrylonitrile-butadiene-styrene, polycarbonate, polyimide, liquid crystal polymer, polyetherimide, polyphenylene sulfide, polysulfone, polystyrene, glycol-modified polyester, polypropylene, or any desired combination thereof. The first main body 11, according to an exemplary embodiment, is made of polycarbonate. The organic filling substances can be made of silicic acid and/or silicic acid derivatives. The laser activator can be made of non-conductive spinel-based inorganic oxide, such as spinel type copper. The mixture includes the thermoplast 65% to 75% by weight, the organic filling substances 22% to 28% by weight, the non-conductive oxide 3% to 7% by weight. The non-conductive oxide can be activated by laser to precipitate metallic crystal nucleus covering the first main body 11.

The antenna radiator 15 is a plating layer coated on a metal area of the first main body 11. The plating layer, according to an exemplary embodiment, includes a copper layer, a nickel layer, and a gold layer orderly coated on the metal area. The copper layer is configured for transmitting/receiving wireless signals. The nickel layer has antioxidant effects for protecting the copper layer. The gold layer is highly conductive for enhancing stability of the antenna radiator 15.

The second main body 13 can be formed by injection molding. The second main body 13 can be a thermoplastic made of polyvinyl chloride, polyethylene terephthalate, acrylonitrile-butadiene-styrene, polycarbonate, polyimide, liquid crystal polymer, polyetherimide, polyphenylene sulfide, polysulfone, polystyrene, glycol-modified polyester, polypropylene, or any desired combination thereof. The second main body 13, according to an exemplary embodiment, is made of acrylonitrile-butadiene-styrene and polycarbonate. An injection-molding temperature of the second main body 13 is lower than an injection-molding temperature of the first main body 11.

An exemplary embodiment of a method for making the housing 10 may comprise the following steps:

A first injection molding machine and a second injection molding machine are provided. The first injection molding machine includes a first molding chamber and the second injection molding machine includes a second chamber. The mixture is injected into the first chamber to form the first main body 11. The non-conductive oxide is activated by laser direct structuring (LDS) to precipitate metallic crystal nucleus covering the metal area of the first main body 11. Thus, the metal area is conductive.

The metal area is metalized to form the antenna radiator 15 using a metallization process. The metallization process can be an electro-plating or a chemical plating method to form the plating layer. The metal area is conductive, thus it can be coated by the plating layer including a copper layer, a nickel layer, and a gold layer in that order.

Figure 3:
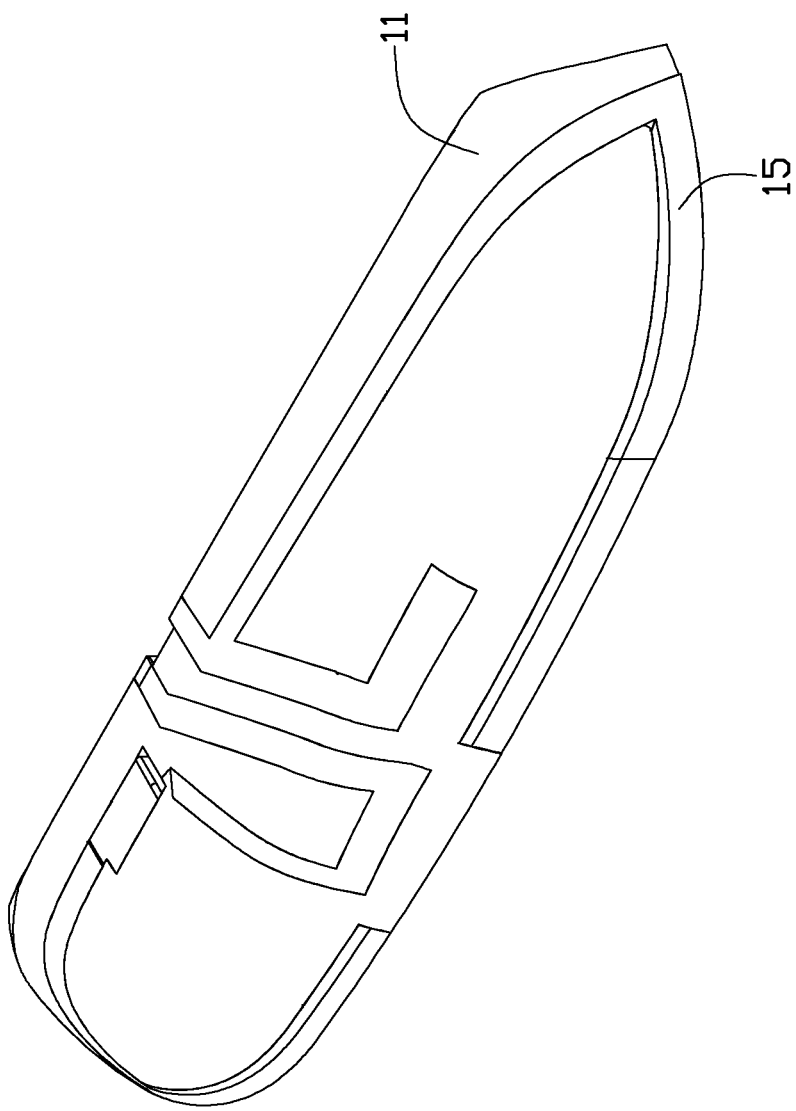
FIG. 3 is an isometric view of just the antenna radiator formed on the first main body of FIG. 2.
Figure 4:
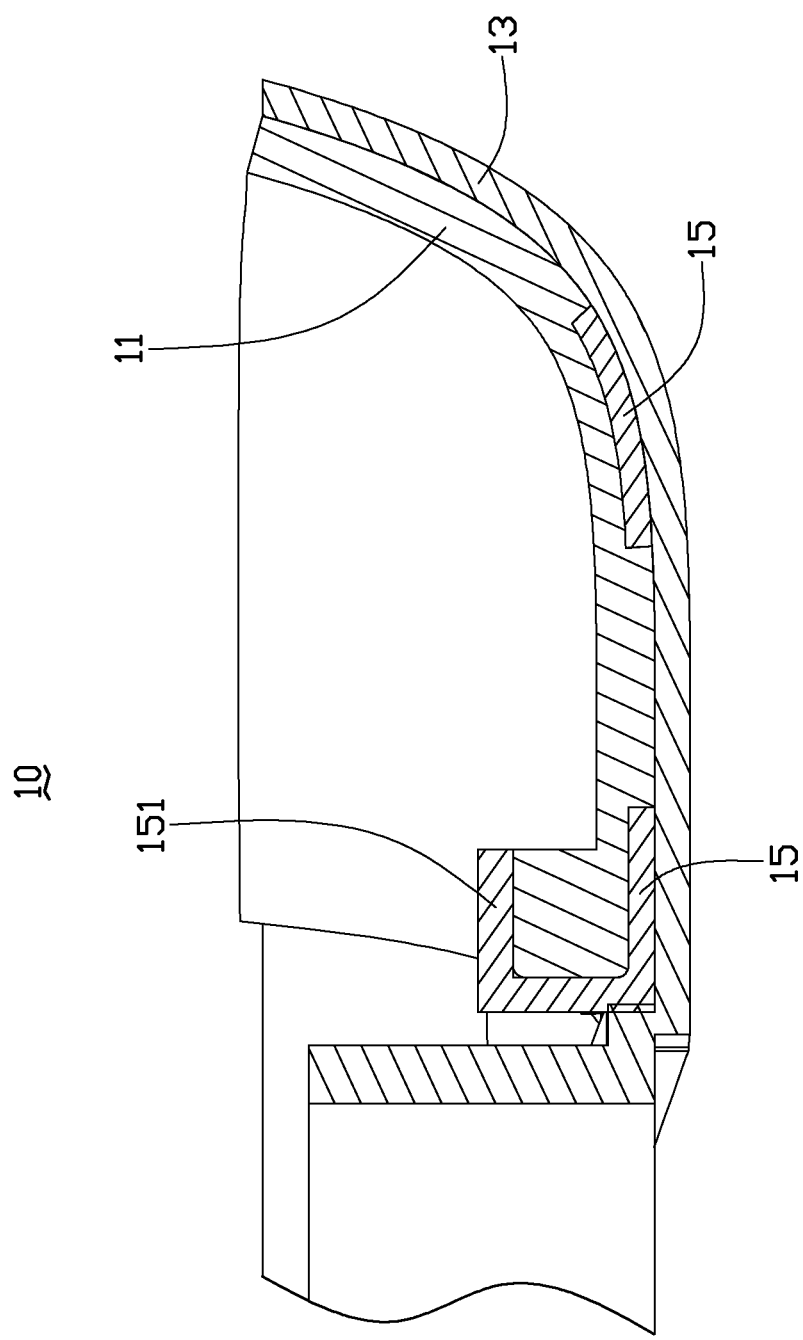
FIG. 4 is a portion of a cross-sectional view of the housing taken along line IV-IV of FIG. 1.

The first main body 11, attached to the antenna radiator 15, is placed into the second chamber. Then, the thermoplastic is injected into the second molding chamber to form the second main body 13 that is attached to a side of the first main body 11, partially covering the antenna radiator 15, leaving the terminal 151 exposed from the first main body 11 and the second main body 1 (see FIGS. 3 and 4).

DETAILED DESCRIPTION

The antenna radiator 15 is embedded in the housing 10, thus, the housing 10 can protect the antenna radiator 15 from being damaged. In addition, the antenna radiator 15 can be directly attached to the housing 10, thus, the working efficiency is increased.

It is to be understood, however, that even through numerous characteristics and advantages of the present disclosure have been set forth in the foregoing description, together with details of the structure and function of the disclosure, the disclosure is illustrative only, and changes may be made in detail, especially in matters of shape, size, and arrangement of parts within the principles of the disclosure to the full extent indicated by the broad general meaning of the terms in which the appended claims are expressed.

What is claimed is:

1. A housing comprising:
   a first main body comprising laser activator, a metal area being formed on the first main body by activating the laser activator using a laser;
   a second main body formed on the first main body; and an antenna radiator formed on the metal area by electroplating and located between the first main body and the second main body;

wherein a portion of the antenna radiator is exposed from the first main body and the second main body to form a terminal, the antenna radiator being isolated from outside by the second main body.

2. The housing as claimed in claim 1, wherein the first main body is made by injection molding and is made of thermoplastic, organic filling substances, and laser activator.

3. The housing as claimed in claim 2, wherein the first main body and the second main body are made of polyvinyl chloride, polyethylene terephthalate, acrylonitrile-butadiene-styrene, polycarbonate, polyimide, liquid crystal polymer, polyetherimide, polyphenylene sulfide, polysulfone, polystyrene, glycol-modified polyester, polypropylene, or any desired combination thereof.

4. The housing as claimed in claim 2, wherein the laser activator is made of spinel-based inorganic oxide.

5. The housing as claimed in claim 4, wherein the laser activator is made of spinel copper.

6. The housing as claimed in claim 2, wherein the organic filling substances is made of silicic acid and/or silicic acid derivatives.

7. The housing as claimed in claim 1, wherein the antenna radiator comprises a plating layer including a copper layer, a nickel layer, and a gold layer orderly coating on the first main body.

8. A method for making a housing, comprising:

injecting a mixture selected from a group consisting of thermoplastic, organic filling substances, and laser activator into a molding chamber of a first injection molding machine to form a first main body;

activating the first main body, wherein the laser activator is activated by laser to form a metal area;

metalizing the metal area to form an antenna radiator on the metal area; and injecting an injection material into a molding chamber of a second injection molding machine to form a second main body attached to the first main body, the antenna radiator being located between the first main body and the second main body, a portion of the antenna radiator is exposed from the first main body and the second main body to form a terminal, the antenna radiator being isolated from outside by the second main body.

9. The method for making a housing as claimed in claim 8, wherein the first main body is made by injection molding and is made of thermoplastic, organic filling substances, and laser activator.

10. The method for making a housing as claimed in claim 9, wherein first main body and the second main body are made of polyvinyl chloride, polyethylene terephthalate, acrylonitrile-butadiene-styrene, polycarbonate, polyimide, liquid crystal polymer, polyetherimide, polyphenylene sulfide, polysulfone, polystyrene, glycol-modified polyester, polypropylene, or any desired combination thereof.

11. The method for making a housing as claimed in claim 10, wherein the organic filling substances is made of silicic acid and/or silicic acid derivatives.

12. The method for making a housing as claimed in claim 9, wherein the laser activator is made of spinel-based inorganic oxide.

13. The method for making a housing as claimed in claim 12, wherein the laser activator is made of spinel consisting copper.

14. The method for making a housing as claimed in claim 9, wherein the antenna radiator comprises a plating layer including a copper layer, a nickel layer, and a gold layer orderly coating on the first main body.

* * * * *